United States Patent [19]
Czernik et al.

[11] 3,794,333
[45] Feb. 26, 1974

[54] GASKET

[75] Inventors: Daniel E. Czernik, Hinsdale; Donald J. McDowell, Riverside, both of Ill.

[73] Assignee: Felt Products Mfg., Co., Skokie, Ill.

[22] Filed: July 20, 1972

[21] Appl. No.: 273,408

[52] U.S. Cl............... 277/180, 277/227, 277/235 B
[51] Int. Cl............................................ F16j 15/10
[58] Field of Search......... 277/180, 166, 227, 235 B

[56] References Cited
UNITED STATES PATENTS

| | | | |
|---|---|---|---|
| 3,352,564 | 11/1967 | Johnson | 277/180 |
| 3,704,021 | 11/1972 | Barbarin | 277/180 |
| 3,167,322 | 1/1965 | Aichroth | 277/180 |
| 3,191,950 | 6/1965 | Hiltner | 277/180 |
| 3,473,813 | 10/1969 | Meyers et al. | 277/180 |
| 3,608,914 | 9/1971 | Harby | 277/235 B |
| 3,653,673 | 4/1972 | Green | 277/227 |

*Primary Examiner*—Herbert F. Ross
*Assistant Examiner*—Robert I. Smith
*Attorney, Agent, or Firm*—Dressler, Goldsmith, Clement & Gordon, Ltd.

[57] ABSTRACT

A method of making a gasket and a gasket having an elastomeric sealing pattern and a control pattern for limiting the degree of compression of the sealing pattern. A relatively incompressible material, such as an epoxy resin formulation is positioned on the face of a gasket to protect a relatively compressible material, such as a silicone rubber and prevents its destruction. The epoxy and silicone patterns may be deposited by silk screening processes.

7 Claims, 8 Drawing Figures

PATENTED FEB 26 1974   3,794,333

GASKET

This invention relates to an improved gasket and to an improved method of making a gasket in which a gasket face is provided with means for limiting the degree of compression of an elastomeric seal thereby to prevent destructive compression of the seal.

Gaskets providing elastomeric sealing elements at their faces for sealing a pair of confronting surfaces are known and are widely used. Most elastomeric seals when compressed beyond about 15 percent to about 35 percent will rupture, crush or extrude, destroying the integrity of the intended seal. The use of such elastomeric sealing elements is accordingly restricted by the tendency of commonly used elastomers to crush, rupture and/or extrude under higher compression loads, and that tendency is a limitation upon gasket design which has become accepted.

A number of proposals have been made to minimize or eliminate inherent deficiencies in the structural load bearing characteristics of elastomeric seals. One proposal has been to increase the amount and area of the elastomer used thereby to reduce the pressure on the elastomer to an acceptable level. Another proposal which has been adopted has been to provide a groove of predetermined area and height at the gasket body face for receiving an elastomeric seal. By controlling the depth and cross-sectional area of the groove, and the height and volume of the elastomeric seal, the degree of compression of the seal can be limited within acceptable tolerances. Yet another method of controlling compression of elastomeric seals has been very carefully and precisely to compress the confronting surfaces to be sealed, as with torque wrenches or the like. That method frequently presents substantial obstacles to achieving uniform compressive loads, as where a plurality of non-uniformly spaced bolts must be torqued to close the confronting surfaces to be sealed.

Elastomeric seals are highly advantageous in a variety of environments. However, their use is limited by the design considerations referred to, and, in many cases, by the expense and difficulty in limiting their compression to acceptable levels.

In accordance with this invention, a new method is provided for producing a gasket which limits the compressibility of an associated elastomeric seal. This invention provides a method for closely controlling and restricting the degree and amount of compression of elastomeric seals and, indeed, for separating and controlling the sealing and structural functions of a gasket bearing an elastomeric seal. The elastomeric seal provides the seal and other means provided on the gasket serve to resist the destructive compression of the elastomeric seal, i.e., provide the structural strength necessary to limit the compression of the seal.

To that end, a suitable gasket having a gasket face which is to confront a surface to be sealed is provided. A curable elastomeric material is deposited on the gasket face to define a selected annular seal pattern. The seal pattern, when cured, projects outwardly from the gasket face, is relatively compressible and is destructible when excessively compressed. A second different material is deposited in a selected pattern on the gasket face. The different material projects outwardly from the gasket face and has substantially greater compressive strength, i.e., a substantially greater resistance to loading in compression, than the elastomeric material, hence may conveniently be referred to as relatively incompressible. When the patterns are cured, as necessary, and the gasket is positioned and compressed between a pair of confronting surfaces to be sealed by the annular seal pattern, the relatively incompressible material limits the compression of the elastomeric annular pattern and resists its destructive compression, i.e., the relatively incompressible material acts as a control means to limit and resist compression of the elastomeric annular pattern, and makes it possible to predetermine the desired degree and location of flange deflection to insure the desired sealing effect. Flange deflection can be increased or decreased, depending upon the design considerations for a given application by selecting the amount and location of a relatively incompressible material vis-a-vis the location of the relatively compressible material.

In a preferred embodiment, the gasket is provided with a plurality of annular elastomeric seal patterns and with the control pattern by silk screening processes, and the control pattern comprises a plurality of pattern segments positioned near the elastomeric seal patterns to limit destructive compression of the seal patterns. The use of a silk screening process provides for close control over the shape, location and size of the seal and control patterns and also makes it possible to make a wide variety of control patterns and seal designs consistent with the requirements of any particular gasketing application.

These and other objects, advantages and features of this invention will become apparent from the following description and drawings of which:

Figure 5:
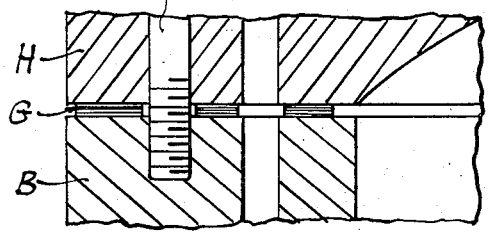
Figure 6:
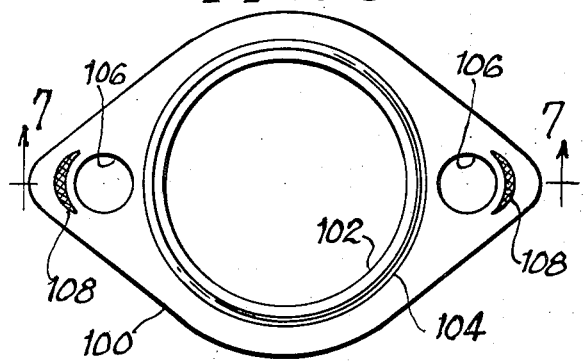
Figure 7:
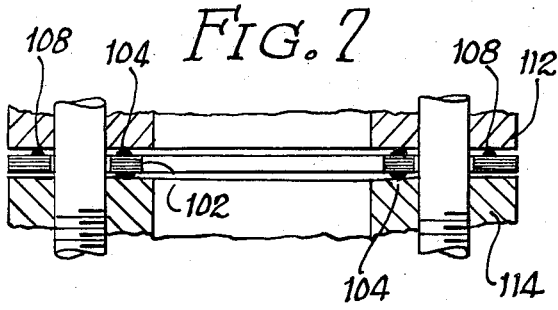

FIG. 5 schematically illustrates a typical environment in which a gasket assembly which may be made in accordance with this invention is adapted to be used;

FIG. 6 illustrates a further gasket assembly of this invention;

FIG. 7 shows the gasket assembly of FIG. 6 under compression; and

Figure 8:
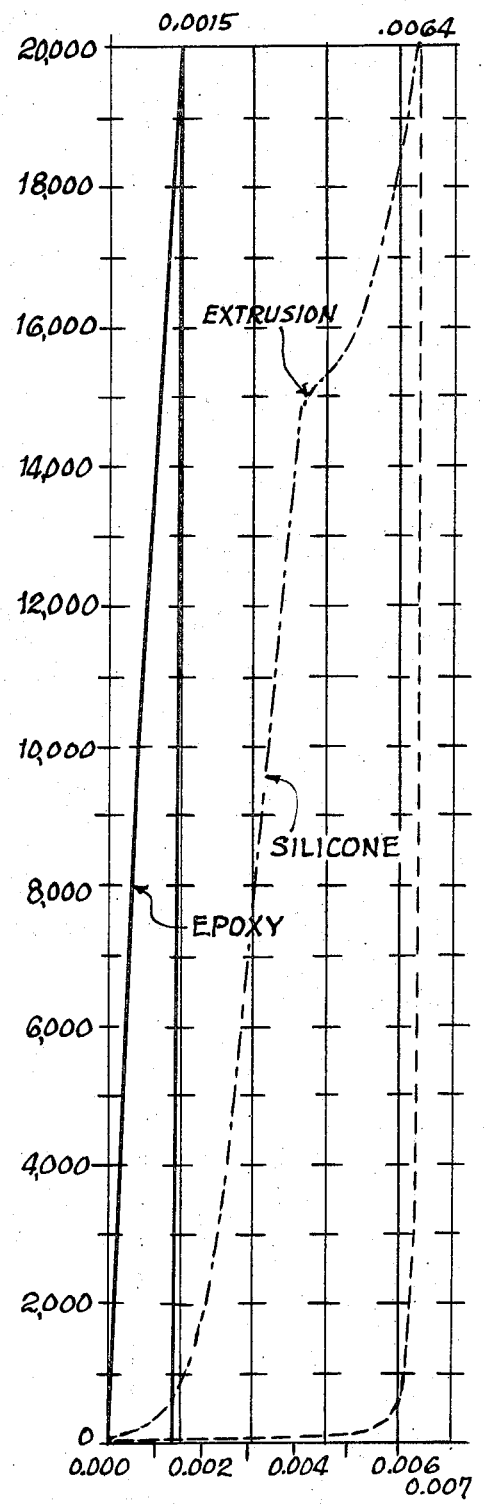

FIG. 8 is a graph illustrating the relative load resistance of a silicone rubber and an epoxy material.

Figure 1:
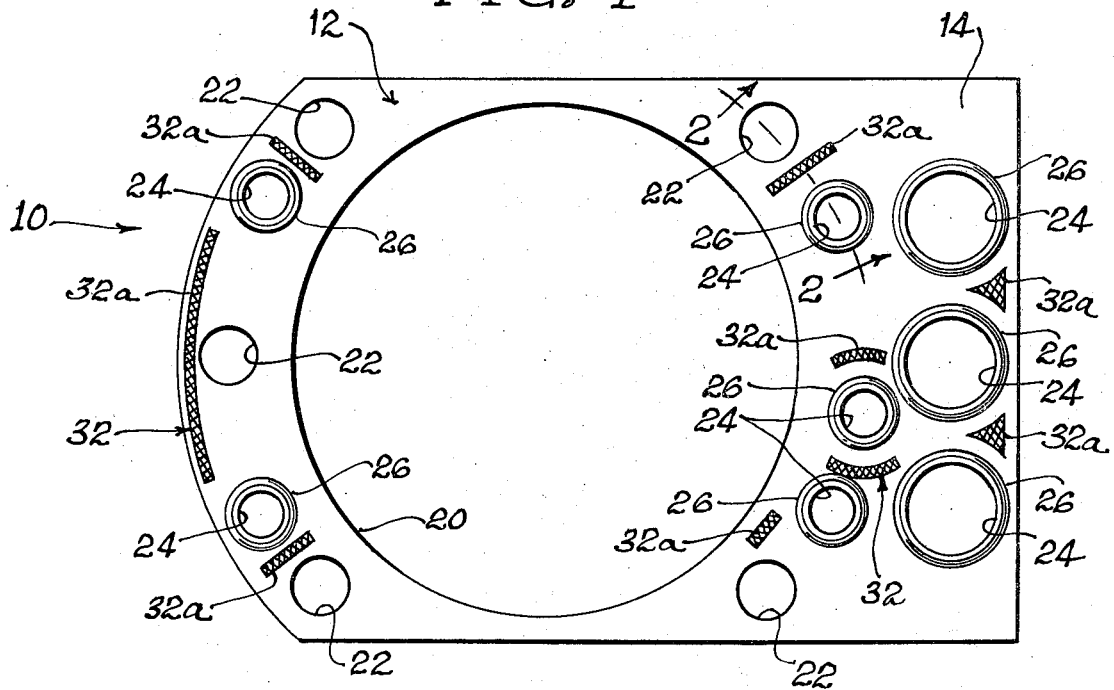
FIG. 1 illustrates a gasket assembly of this invention.
Figure 2:
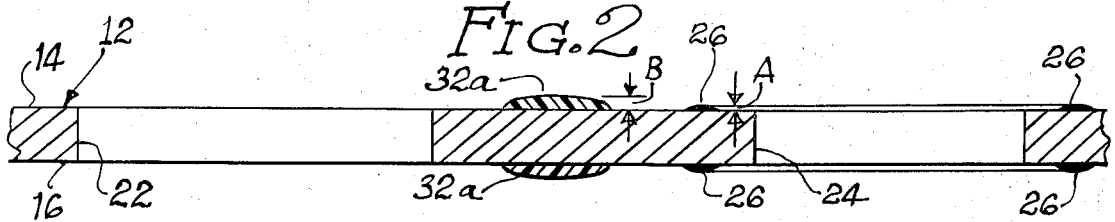
FIG. 2 is an enlarged cross-sectional view taken substantially along the line 2—2 of FIG. 1.

Referring first to FIGS. 1 and 2, a typical gasket assembly 10 embodying the principles of this invention comprises a main gasket base or body 12 having a first upper gasket face 14 and a second lower gasket face 16. The main gasket body 12 illustrates is a steel plate which may be approximately 0.080 inch thick. However, the gasket body, depending upon the use to which the gasket assembly is to be put, may be of other materials and constructions, of which those identified in U.S. Pat. Nos. 3,565,449 and 3,108,818 are typical.

The gasket assembly 10 is especially configured and constructed to be used in an internal combustion engine of which FIG. 5 is a fragmentary schematic representation. Such an engine includes an engine block B and an engine head H secured by bolts S and sealed by a gasket G. The gasket G defines appropriate openings for the cylinder, the oil and water passages and the compression bolts, and is proportioned to seal at each of these openings.

The gasket body 12 defines a plurality of suitably positioned apertures, at least one of which is a combustion opening 20. Other openings are bolt holes 22 and still others are oil and water passages 24 through which fluids pass.

The water and oil passages must be suitably sealed to prevent the escape of water and oil from the openings in the engine block and head which they confront. Accordingly, annular seal patterns, such as circular seal patterns 26 are provided around the passages 24. Seal patterns 26 are of a material which, when compressed between confronting compression surfaces (such as those of an engine block and head) will seal against the confronting surfaces to prevent the escape of oil and water as they flow through passages 24.

In the gasket assembly of FIG. 1, the annular seal material is an elastomeric material, such as room temperature vulcanizable silicone rubber, such as a methyl phenyl silicone, which has been deposited to provide an annular bead and which has then been cured. Because such elastomeric materials will compress only up to about 35 percent or less prior to destructive crushing, rupturing and/or extruding, control means in accordance with this invention are provided on the gasket faces for limiting the compression of the annular seal patterns 26 and for preventing their destructive compression within, of course, predetermined design limits.

Figure 3:
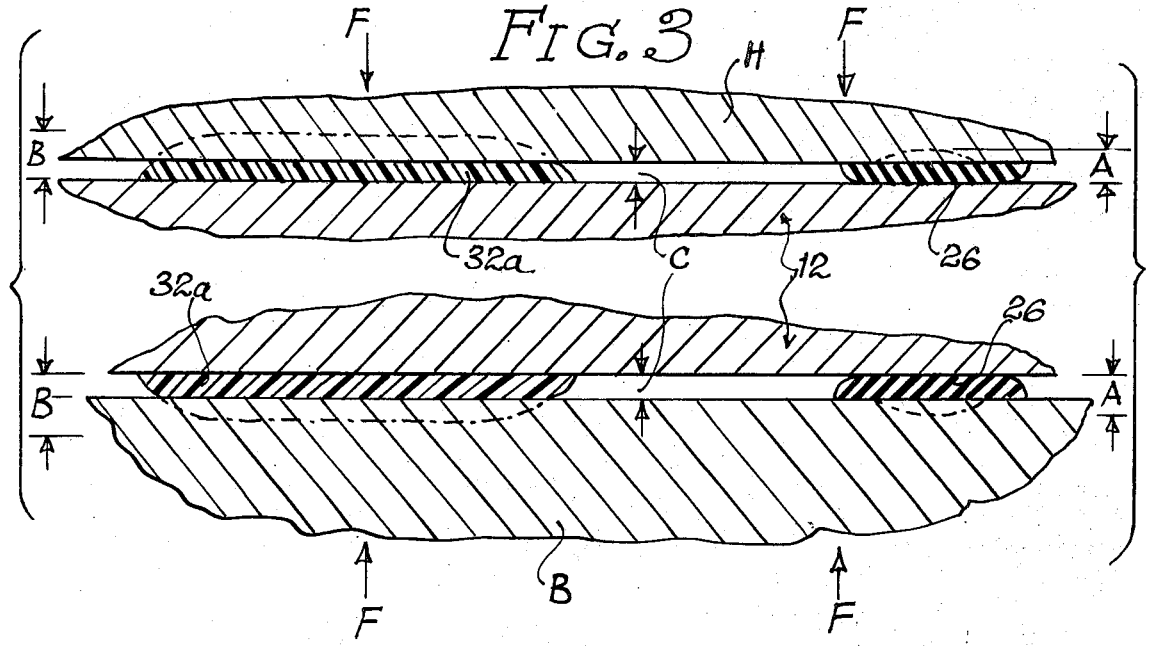
FIG. 3 is an enlarged fragmentary view of a portion of FIG. 2 under compression.

The control means in FIGS. 1 to 3 comprises a preselected pattern 32 of a relatively incompressible material, which material is different from the elastomer of the seal patterns 26. Control pattern 32 consists of a plurality of pattern segments 32a adjacent the seal patterns 26.

Segments 32a are located according to predetermined strength and design characteristics preferably to provide the minimum amount of relatively incompressible material in a minimum number of discrete locations to resist compression of each of the seal patterns 26. The locations of the pattern segments 32a, of course, will depend upon a number of factors, such as the compressive forces to be exerted, the number of annular seal patterns and the amount of annular seal material, the location of the bolts, mating flange rigidity, and the like, but in any event will resist and limit, to the extent desired and necessary, the crushing of the seal patterns, hence destruction of the designed sealing capacity of the seal patterns and of the gasket assembly.

One material that has been found to be suitable for the formation of a selected control pattern comprises, by weight, 100 parts of epoxy resin, 10 parts of a boron trifluoride monothyl amine complex curing agent, such as BF-3MEA made by Allied Chemical Corporation, a very finely divided, absorbent thixotropic silica such as Cab-O-Seal MS-5 made by Cabot Corporation, and 50 parts of a very finely divided silica flour. The epoxy resin used was a digycidyl ether bis phenol A, having an epoxide equivalent of 180-200 and a viscosity of 10,000 to 16,000 cps.

Because in many environments sealing against both compressive surfaces, such as an engine block and an engine head, is necessary, the seal patterns and control patterns have been shown as being on each of the gasket faces 14 and 16.

It has been determined that the controlled deposition of annular seal patterns 26 and the selected control pattern 32 may most efficiently and effectively be accomplished by a silk screening process, and generally in accordance with the disclosure of U.S. Pat. No. 3,477,867. Accordingly, a gasket assembly 10 in accordance with this invention may be made by providing a suitably apertured gasket body 12, and by then depositing, as by silk screening, an elastomeric material in predetermined patterns on one or both faces about the areas in which the openings to be sealed are located. A different control material is also deposited by silk screening, in a selected pattern on the same faces of the gasket body. The control material is relatively incompressible whereas the elastomeric material is relatively compressible. The openings in the gasket body may be provided before or after silk screening, as by cutting or punching the apertures.

The selected pattern preferably provides a plurality of spaced segments which are positioned near the elastomeric seal patterns to limit the compression of the elastomeric patterns when the gasket is positioned and compressed between a pair of confronting surfaces to be sealed. The elastomeric material and the control material, in the embodiment illustrated, are each deposited in a first uncured form which must be suitably cured. Accordingly, the materials are appropriately cured following their deposition.

Referring now to FIG. 2, the annular seal patterns 26, when cured, project outwardly from the gasket face a first distance A, whereas the selected pattern 32 projects outwardly from the gasket face a second distance B. The outward projection of the patterns is predetermined by a number of factors, such as the degree of compression which the seal patterns will tolerate, and others of those referred to above. When a gasket in accordance with this invention is compressed between a pair of confronting surfaces, such as surfaces of a head H and a block B, in the embodiment illustrated, the selected pattern is initially crushed to a predetermined extent, gradually to permit the confronting surfaces to compress the annular seal patterns 26, but only to a limited extent. As such, under compressive loading in the direction F, the distance B as seen in FIG. 3, is diminished to a point at which the selected control pattern segments 32a allow limited compression of the seal patterns 26, controlling the spacing between the gasket and the confronting surfaces under predetermined compression to a pre-selected distance C.

In the embodiment of FIGS. 1 to 3, the selected control pattern segments 32a project outwardly from the gasket face a distance B which is greater than the distance A. For example, the seal patterns may project outwardly about 0.003–0.005 inch, the pattern segment about 0.005–0.007 inch, the pattern segments being compressed to a distance C of less than about 0.003–0.005 inch in FIG. 3. However, depending upon the design characteristics of any particular gasket assembly, the distances A and B may be equal or B may be greater or lesser than A. In all such cases, however, the relatively incompressible control material acts to limit the compression of the seal patterns to the extent necessary to resist destructive compression of the elastomeric seal patterns. The control material by limiting the compression, also serves to minimize stress relaxation and creep of the elastomeric seal patterns. This results in improved torque retention over a lengthy period.

As best seen in FIGS. 2 and 3, the selected pattern elements 32a and the annular seal patterns 26 terminate upwardly in convex uppermost faces, each gradually to be flattened under compression and to be displaced in a controlled manner. This most effectively provides the close control over the respective structural and sealing functions of the patterns 32 and 26.

Although room temperature vulcanizable silicone has been described as a preferred material having elastomeric characteristics, other elastomers or elastomeric-like materials may be used as well, such as, for example, polysulfides, urethanes, dibromo-polybutadiene, among others, and the terms elastomer and elastomeric as used herein should be understood to include materials which are elastomeric or elastomeric-like. Also, in the preferred embodiment, an epoxy resin formulation has been described as being the preferred material from which the selected control pattern 32 may be deposited and formed. Other materials which are relatively incompressible vis-a-vis the elastomeric seal pattern used for a particular gasket may also be used, such as, for example, phenolic resins. Further, although silk screening has been described as the deposition process most to be preferred, it is possible to deposit materials by other processes to provide beads having the necessary thickness. One such process is to deposit a bead of sealant from such as a caulking gun and another such process is a stencilling process.

Figure 4:
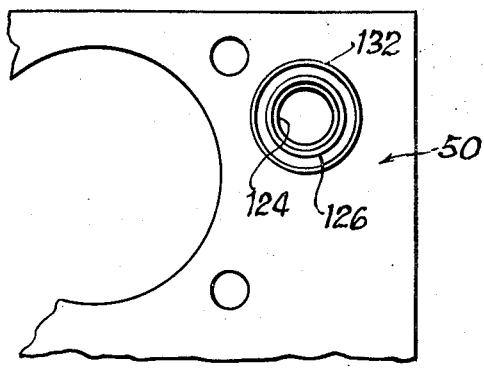
FIG. 4 illustrates a further embodiment of a gasket assembly of this invention.

FIG. 4 illustrates a further embodiment of this invention. The gasket assembly 50 there shown is substantially identical to that of FIGS. 1 to 3 except that an opening 124 is provided with an annular seal pattern 126 which is concentric with an annular control pattern 132, rather than a plurality of pattern segments like segments 32a. Indeed, in such an embodiment the control pattern may also function as a secondary seal.

The structural or control material has been referred to as being relatively incompressible, which it is insofar as it compares to the structural strength of the sealing material it is used to protect. It is not, however, incompressible in an absolute sense, as is clear from the foregoing description and from FIG. 3. The important fact is that it is less compressible and more resistant to crushing than the elastomeric materials it protects against destructive compression.

FIG. 5 is a schematic representation of the environment in which a gasket assembly incorporating the principles of this invention may be used, illustrating the relationship of a head, block and gasket. A more detailed illustration of an actual engine environment in which a gasket of the invention may be used may be seen, for example, in U.S. Pat. No. 3,560,007.

A control pattern, in addition to protecting the elastomeric material against destructive compression also may be placed and positioned to control deflection of the confronting surfaces to be sealed. FIGS. 6 and 7 illustrate a further gasket assembly 100 defining a passage 102 to be sealed and being provided with a seal pattern 104, as of a silicone rubber which requires protection. Gasket assembly 100 defines a pair of bolt holes 106 and is further provided with a control pattern comprising a pair of control pattern segments 108. They are positioned outboard of the bolt holes 106 so that they will both protect the seal pattern 104 and will limit and control deflection of the confronting surfaces to be sealed.

Referring now to FIG. 7, an upper member 112 is sealed against seal pattern 104 and is maintained substantially flat by the control pattern segments 108 whereas a lower member 114 has both crushed lower seal pattern 104 and has bowed or deflected substantially because there is no control pattern 108 on the lower surface of the gasket assembly. Thus FIG. 7 illustrates that the absence of the control pattern and that the particular location of a control pattern enables one to select and control the degree and location of flange deflection which is desired or which can be tolerated.

FIG. 8 illustrates the comparative results of compressing silicone and epoxy beads. In each case a bead 0.007 inch high and having substantially the cross-sectional shape of seal pattern 26 as illustrated in FIG. 2 and being one-eighth inch wide and seven inches long was placed under compression. A silicone bead compressed to about one-half its height at a load of 10,000 pounds, and extruded at about 15,000 pounds. It reduced to less than 10 percent of its initial height at 20,000 pounds and exhibited no recovery upon load relaxation. On the other hand, an epoxy bead was essentially crush-resistant, relatively speaking, losing only about 20 percent of its height under a load of 20,000 pounds. FIG. 8 graphically illustrates that under compression an epoxy pattern will protect a more compressible pattern, such as one of a silicone rubber, and that a relatively incompressible pattern can be used to keep the loading of a more compressible pattern below a maximum level at which destruction occurs, such as below the level at which extrusion will occur.

It may be seen that the practice of this invention makes it possible to utilize elastomeric seals on gaskets in environments in which it was not possible to use them previously in any economically meaningful sense. By appropriately designing the heights and amounts of sealing patterns and control patterns, the degree of compression of the sealing patterns may be closely controlled within the capacity of the sealing material to resist destructive compression. By varying the characteristics and geometry of the relatively incompressible structural material, a wide range of flange loadings, flange deflection and variation in unit loads can be compensated for and designed for as well, adding to the overall utility of the gasket assemblies of this invention and those which may be made in accordance with this invention.

It will be apparent from the foregoing that further embodiments of this invention may be made without departing from the spirit and scope of the invention. Accordingly the scope of the invention is to be considered as being limited only in accordance with the claims.

What is claimed is:

1. A gasket providing for controlled compressibility of an annular elastomeric seal on a face thereof, a gasket base providing a first gasket face and defining at least one aperture therein, an annular seal pattern deposited and cured on said face and surrounding a said aperture, said seal pattern comprising a relatively compressible, elastomeric material different from the material of said first gasket face, a selected control pattern deposited and cured on said face and spaced inwardly of edges of said first gasket face and spaced from the edges of said apertures, said control pattern comprising control material of a lesser degree of compressibility than said seal pattern, said control material being different from the material of said first gasket face and from said elastomeric material, said seal pattern and said control pattern each projecting outwardly from said gasket face, whereby when said gasket is positioned and compressed between a pair of contronting surfaces to be sealed by said annular seal pattern, the control pattern limits compression of said annular seal pattern and resists destructive compression of said annular seal pattern.

2. A gasket in accordance with claim 1 wherein said selected control pattern comprises at least two pattern segments near said annular seal pattern.

3. A gasket in accordance with claim 1 wherein there are a plurality of said annular seal patterns on said face and said control pattern is positioned to limit compression of said annular seal patterns and to resist destructive compression of said annular seal patterns.

4. A gasket in accordance with claim 1 in which said stop material comprises an exoxy resin.

5. A gasket in accordance with claim 1 in which said control material projects outwardly from said face beyond said annular seal pattern.

6. A gasket in accordance with claim 1 wherein said control pattern is an annular pattern concentric with said annular seal pattern and functions also to provide a secondary seal.

7. A gasket in accordance with claim 1 wherein said gasket base has a second gasket face, and a said annular seal pattern and a said selected control pattern are also deposited and cured on said second face.

* * * * *